(12) United States Patent
Tsai (10) Patent No.: US 10,306,497 B2
(45) Date of Patent: May 28, 2019

(54) METHOD FOR DETERMINING STABILITY OF A WIRELESS SIGNAL AND SYSTEM THEREOF

(71) Applicant: QISDA CORPORATION, Taoyuan (TW)

(72) Inventor: Chen-Chen Tsai, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 19 days.

(21) Appl. No.: 15/853,948

(22) Filed: Dec. 25, 2017

(65) Prior Publication Data

US 2018/0352455 A1    Dec. 6, 2018

(30) Foreign Application Priority Data

Jun. 2, 2017    (TW) .............................. 106118225 A (51) Int. Cl.
*H03M 13/00*    (2006.01)
*H04L 1/00*    (2006.01)
*H04L 1/08*    (2006.01)
*H04W 24/08*    (2009.01)
*G01S 5/02*    (2010.01)

(52) U.S. Cl.
CPC ........... *H04W 24/08* (2013.01); *G01S 5/0252* (2013.01); *G01S 5/0278* (2013.01)

(58) Field of Classification Search
CPC .. H04B 7/0632; H04B 17/309; H04B 17/318; H04W 36/30; H04L 1/0026; H04L 5/006; A61B 5/7221
See application file for complete search history.

(56) References Cited

U.S. PATENT DOCUMENTS 8,515,477 B2    8/2013 Yamamoto
9,219,574 B2 *  12/2015 Hwang ................. H04L 1/0061

* cited by examiner

*Primary Examiner* — Gary Lafontant (57) ABSTRACT

A method for determining stability of a wireless signal includes transmitting a plurality of transmitted testing signals periodically during a time interval, receiving the plurality of transmitted testing signals and identifying at least one received testing signal from the plurality of transmitted testing signals, and generating a signal stability indicator according to a time weighting of each received testing signal of the at least one received testing signal.

15 Claims, 4 Drawing Sheets

METHOD FOR DETERMINING STABILITY OF A WIRELESS SIGNAL AND SYSTEM THEREOF

BACKGROUND OF THE INVENTION

1. Field of the Invention

The present invention illustrates a method for determining stability of a wireless Signal, and more particularly, a method for determining stability of a wireless Signal by using a signal quality factor.

2. Description of the Prior Art

With the rapid advancement of technologies, point-to-point wireless communications or server-based wireless communications technology are popularly developed. For example, two smartphones may use Bluetooth protocol or Wi-Fi Protocol for communicating signals or sharing data resources. For communications between two different devices, a quality of service (QoS), a signal to noise ratio (SNR), and an error rate of the wireless signal are affected by quality of a wireless channel. Generally, the wireless channel often suffers from at least one type of interference, such as a rain attenuation effect, a time-variation interference effect, a frequency offset interference effect. When the quality of the wireless channel decreases, a wireless link between two different devices becomes unstable. At the moment, a transmitter and a receiver may constantly try to re-establish or stabilize their wireless link.

When the transceiver constantly tries to re-establish or stabilize the wireless link, the transceiver would repeatedly re-configure and re-try in order to access data through the wireless link, thereby resulting in high power consumption. Also, since system resources are required for recovering the wireless link, severe system resource consumption would occur when the transceiver attempts to re-establish or recover the wireless link.

Conventional method for detecting stability of a wireless signal can be performed according to a received signal strength indicator (RSSI). However, a definition of the RSSI is only regarded as an intensity factor of the received signal. Thus, the RSSI is lack of instability information of jamming interference within a specific frequency band or interference of adjacent frequency band. Moreover, the RSSI is lack of information of a trend of the stability of the wireless signal. Further, a stability prediction algorithm of the wireless signal is hard to implement since the information of the RSSI is insufficient. Therefore, the conventional method for determining or detecting the stability of the wireless signal according to the RSSI is inaccurate. Further, since the conventional method is inaccurate, a false alarm error or a miss error would frequently occur. As a result, the transmitter and receiver have to re-establish or recover the wireless link frequently, leading to high power consumption and severe resource consumption.

SUMMARY OF THE INVENTION

In an embodiment of the present invention, a method for determining stability of a wireless signal is disclosed. The method comprises transmitting a plurality of transmitted testing signals periodically during a time interval, receiving the plurality of transmitted testing signals and identifying at least one received testing signal from the plurality of transmitted testing signals, and generating a first signal stability indicator according to a time weighting of each received testing signal of the at least one received testing signal. The time weighting is a positive real value. A time weighting of a received testing signal later identified is greater than a time weighting of a received testing signal previously identified.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
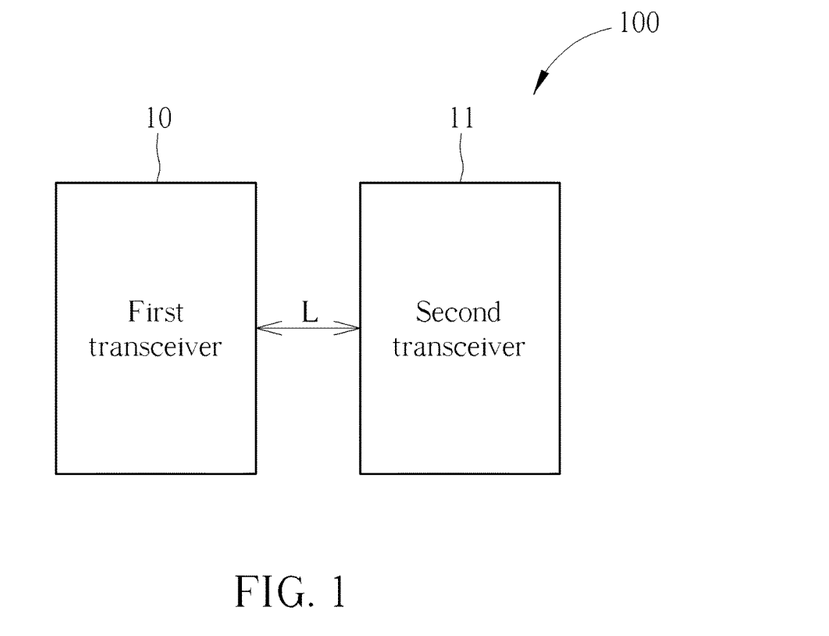
FIG. 1 is an illustration of a system for determining stability of a wireless signal according to an embodiment of the present invention.

FIG. 1 is an illustration of a system 100 for determining stability of a wireless signal according to an embodiment of the present invention. The system 100 can be a point-to-point based wireless communications system, or a server-based wireless communications system. Generally, any two different transceivers capable of establishing a wireless link and communicating data belong to the system 100 of the present invention. The system 100 includes a first transceiver 10 and a second transceiver 11. The first transceiver 10 can be any device capable of transceiving a wireless signal, such as a smartphone, notebook, or tablet. The second transceiver 11 can be any device capable of transceiving the wireless signal, such as a smartphone, notebook, or tablet. A wireless link L can be established between the first transceiver 10 and the second transceiver 11. Further, after the wireless link L is established, bi-directional data communications between the first transceiver 10 and the second transceiver 11 can be performed through the wireless link L. For simplicity, hereafter, the first transceiver 10 is regarded as a transmitter for transmitting the wireless signal. The second transceiver 11 is regarded as a receiver for receiving the wireless signal. However, since bi-directional data communications can be performed between the first transceiver 10 and the second transceiver 11, the second transceiver 11 can also be regarded as a transmitter. The first transceiver 10 can also be regarded as a receiver. Any reasonable technology modification falls into the scope of the present invention.

Figure 2:
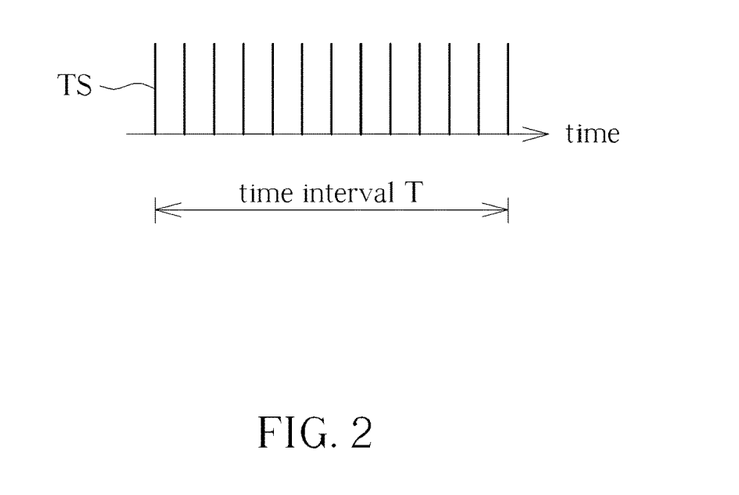
FIG. 2 is an illustration of transmitting a plurality of transmitted testing signals from a first transceiver of the system in FIG. 1.

FIG. 2 is an illustration of transmitting a plurality of transmitted testing signals TS from the first transceiver 10 of the system 100. The system 100 can accurately determine stability of a wireless signal and further generate a stability trend of the wireless signal. In order to accurately determine stability of the wireless signal, the first transceiver 10 can transmit the plurality of transmitted testing signals TS to the second transceiver 11. The plurality of transmitted testing signals TS can be pilot signals with identical (or almost identical) power. The first transceiver 10 can periodically transmit the plurality of transmitted testing signals TS during a predetermined time interval T. For example, X axis is denoted as a time axis in FIG. 2. The first transceiver 10 can periodically transmit $N_{TX}$ transmitted testing signals TS during the time interval T. Here, $N_{TX}$ is a positive integer. In other words, a time interval of two adjacent transmitted testing signals TS of the $N_{TX}$ transmitted testing signals TS is approximate to $T/N_{TX}$ when $N_{TX}$ is large. Eventually, the $N_{TX}$ transmitted testing signals TS are transmitted from the first transceiver 10 to the second transceiver 11 during the time interval T.

Figure 3:
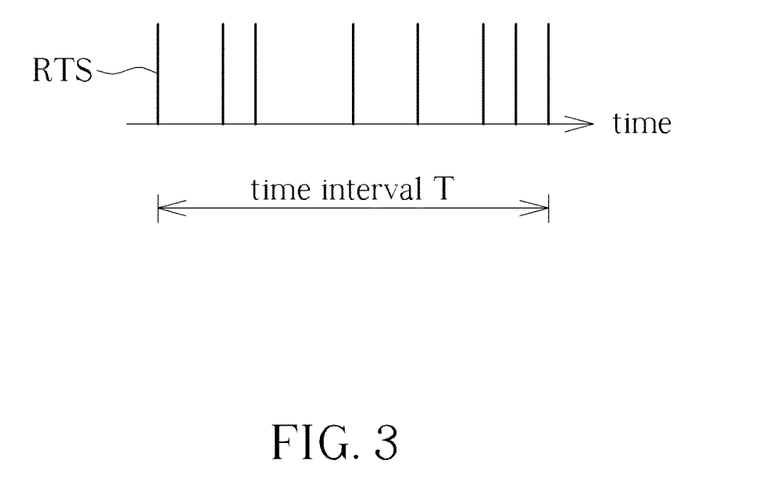
FIG. 3 is an illustration of identifying a plurality of received testing signals by a second transceiver of the system in FIG. 1.

FIG. 3 is an illustration of identifying a plurality of received testing signals RTS by the second transceiver 11 of the system 100. After the $N_{TX}$ transmitted testing signals TS are transmitted from the first transceiver 10 to the second transceiver 11 during the time interval T as shown in FIG. 1, the second transceiver 11 can receive these transmitted testing signals TS. Specifically, when the $N_{TX}$ transmitted testing signals TS pass the wireless channel, various interferences may interfere the transmitted testing signals TS, leading to power distortion. Thus, if some transmitted testing signals TS suffer from severe power distortion at certain time points, they cannot be identified by the second transceiver 11. For example, in FIG. 2, the first transceiver 10 transmits 13 transmitted testing signals TS (i.e., $N_{TX}$=13). However, since the power distortion of the wireless channel is introduced, only eight received testing signals RTS can be identified by the second transceiver 11 (i.e., $N_{RX}$=8). In other words, only $N_{RX}$ received testing signals RTS can be identified from the $N_{TX}$ transmitted testing signals TS by the second transceiver 11. $N_{RX}$ is smaller than or equal to $N_{TX}$.

Figure 4:
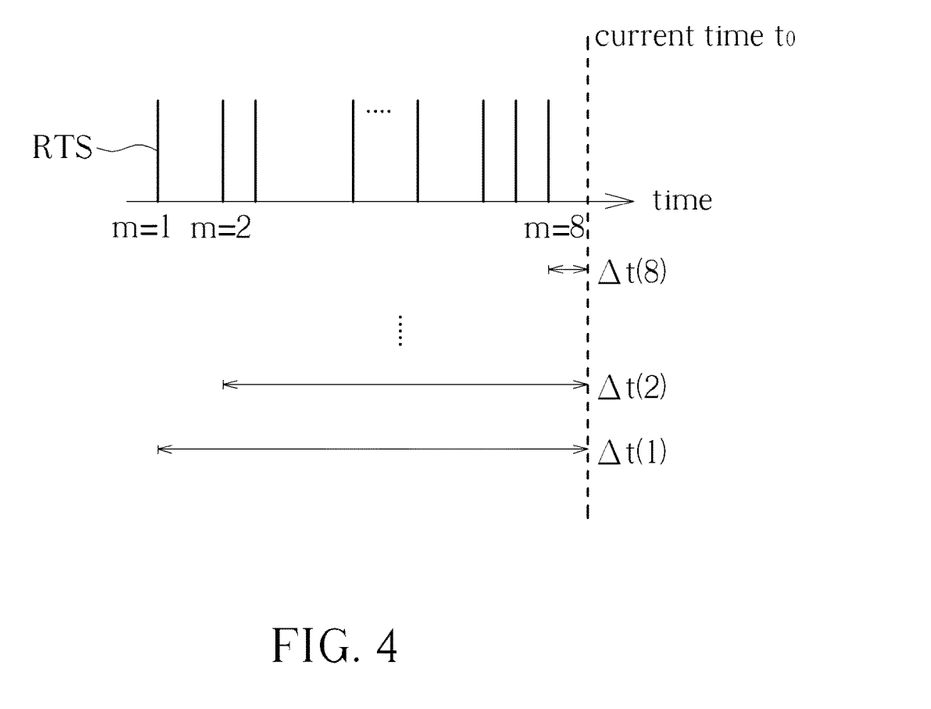
FIG. 4 is an illustration of absolute time differences corresponding to the plurality of received testing signals of the system in FIG. 1.

FIG. 4 is an illustration of absolute time differences corresponding to the plurality of received testing signals RTS of the system 100. After $N_{RX}$ received testing signals RTS are identified by the second transceiver 11 during the time interval T, a signal stability indicator can be calculated. The calculation mechanism is illustrated below. In FIG. 4, X axis is denoted as a time axis. $t_0$ is denoted as current time. m is denoted as a time index. A received testing signal RTS corresponding to a time index m equal to one (i.e., m=1) is regarded as a received testing signal previously identified. A received testing signal RTS corresponding to a time index m equal to eight (i.e., m=8) is regarded as a received testing signal later identified, which is close to the current time $t_0$. After the current time $t_0$ and each arrival time of each received testing signal RTS are determined, an absolute time difference corresponding to each received testing signal can be derived. For example, an absolute time difference of the received testing signal RTS corresponding to a time index m equal to one (i.e., m=1) can be denoted as $\Delta t(1)$. The absolute time difference $\Delta t(1)$ is equal to an absolute value of a time difference between an arrival time of the received testing signal RTS corresponding to the time index m equal to one and the current time $t_0$. An absolute time difference of the received testing signal RTS corresponding to a time index m equal to two (i.e., m=2) can be denoted as $\Delta t(2)$. The absolute time difference $\Delta t(2)$ is equal to an absolute value of a time difference between an arrival time of the received testing signal RTS corresponding to the time index m equal to two and the current time $t_0$. Similarly, an absolute time difference of the received testing signal RTS corresponding to a time index m equal to eight (i.e., m=8) can be denoted as $\Delta t(8)$. The absolute time difference $\Delta t(8)$ is equal to an absolute value of a time difference between an arrival time of the received testing signal RTS corresponding to the time index m equal to eight and the current time $t_0$. Therefore, an absolute time difference corresponding to the received testing signal RTS later identified (i.e., m=8) is smaller than an absolute time difference corresponding to the received testing signal RTS previously identified (i.e., m=1). Then, a positive real value k can be selected by the system 100. Further, the system 100 can generate a time weighting equal to $-k^{th}$ power of the absolute time difference. For example, a time weighting of the received testing signal RTS corresponding to the time index m equal to one can be denoted as $(\Delta t(1))^{-k}$. A time weighting of the received testing signal RTS corresponding to the time index m equal to two can be denoted as $(\Delta t(2))^{-k}$. Similarly, a time weighting of the received testing signal RTS corresponding to the time index m equal to eight can be denoted as $(\Delta t(8))^{-k}$. As previously mentioned, since the absolute time difference corresponding to the received testing signal RTS later identified (i.e., $\Delta t(8)$) is smaller than the absolute time difference corresponding to the received testing signal RTS previously identified (i.e., $\Delta t(1)$), the time weighting of the received testing signal RTS later identified (i.e., $(\Delta t(8))^{-k}$) is greater than the time weighting of the received testing signal RTS previously identified (i.e., $(\Delta t(1))^{-k}$). After that, the system 100 can generate a signal stability indicator equal to a time weighting sum of the plurality of received testing signals RTS. The mathematical representation of the signal stability indicator IN can be written below.

$$IN = \sum_{m=1}^{8} (\Delta t(m))^{-k} \quad \text{(Equation 1)}$$

In Equation 1, IN is denoted as the signal stability indicator. In the embodiment, the second transceiver 11 can identify eight received testing signals RTS (i.e., $N_{RX}$=8). However, the system 100 is not limited to eight received testing signals. Particularly, since the signal stability indicator IN is equal to the time weighting sum of the plurality of received testing signals RTS corresponding to different time indices (i.e., m=1~8), the signal stability indicator IN is dominated by time weightings of the received testing signals RTS later identified (i.e., $\Delta t(8))^{-k}$, $\Delta t(7))^{-k}$ are greater than $\Delta t(1))^{-k}$). In other words, the time weightings of the received testing signals RTS later identified can be regarded as dominating terms of the signal stability indicator IN.

The signal stability indicator IN generated by the system 100 can be regarded as reference data of signal stability. A reason is illustrated below. Since the time weightings close to current time can dominate the signal stability indicator IN, when the $N_{RX}$ received testing signals RTS are identified by the second transceiver 11 and most received testing signals RTS are distributed within time indices close to current time, it implies that the wireless signal quality is getting better. A signal stability indicator IN generated by invoking Equation 1 maybe a large positive value. When the $N_{RX}$ received testing signals RTS are identified by the second transceiver 11 and most received testing signals RTS are distributed within time indices close to previous time, it implies that the wireless signal quality is getting worse. A signal stability indicator IN generated by invoking Equation 1 may be a small positive value. In other words, the signal stability indicator IN is relevant to a distribution of arrival times of the $N_{RX}$ received testing signals RTS. When the signal stability indicator IN is large, it implies that a successful identification probability of the received testing signals RTS with arrival times close to current time is high. The wireless signal quality is satisfactory. When the signal stability indicator IN is small, it implies that the successful identification probability of the received testing signals RTS with arrival times close to current time is low. The wireless signal quality is poor.

In practice, the arrival times of all received testing signals RTS in FIG. 3 can be converted to digital data for hardware implementation of the system 100. As previously mentioned, the time interval of two adjacent transmitted testing signals TS of the $N_{TX}$ transmitted testing signals TS is approximate to $T/N_{TX}$ when $N_{TX}$ is large. Eventually, the $N_{TX}$ transmitted testing signals TS are transmitted from the first transceiver 10 to the second transceiver 11 during the time interval T. Thus, for the second transceiver 11, a value address stored in a memory or register can be shifted S bits to a less significant bit (LSB) in every time interval equal to $T/N_{TX}$. S can be a predetermined positive integer. For example, an offset S can be equal to $C/N_{TX}$ bits. C is denoted as number of bits corresponding to maximum capacity of the memory or register. When the value address is shifted to $C/N_{TX}$ bits, it implies that the time interval equal to $T/N_{TX}$ elapses. After that, the second transceiver 11 receives a transmitted testing signal TS and determines whether the transmitted testing signal TS can be identified or not. When the transmitted testing signal TS can be identified to become a received testing signal RTS, a most significant bit (MSB) is set to one. Then, the second transceiver 11 keeps waiting the time interval equal to $T/N_{TX}$ for receiving and then monitoring a following transmitted testing signal TS. On the contrary, when the transmitted testing signal TS is not identified, values of all bits in the memory or register are held without any modification. Then, the second transceiver 11 keeps waiting the time interval equal to $T/N_{TX}$ for receiving and then monitoring a following transmitted testing signal TS. Therefore, after $N_{RX}$ received testing signals RTS are identified by the second transceiver 11 during the time interval T, all arrival times of the $N_{RX}$ received testing signals RTS can be observed as addresses corresponding to bits with logic "1" in the memory or the register. By doing so, the distribution of arrival times of the $N_{RX}$ received testing signals RTS can be easily observed.

Figure 5:
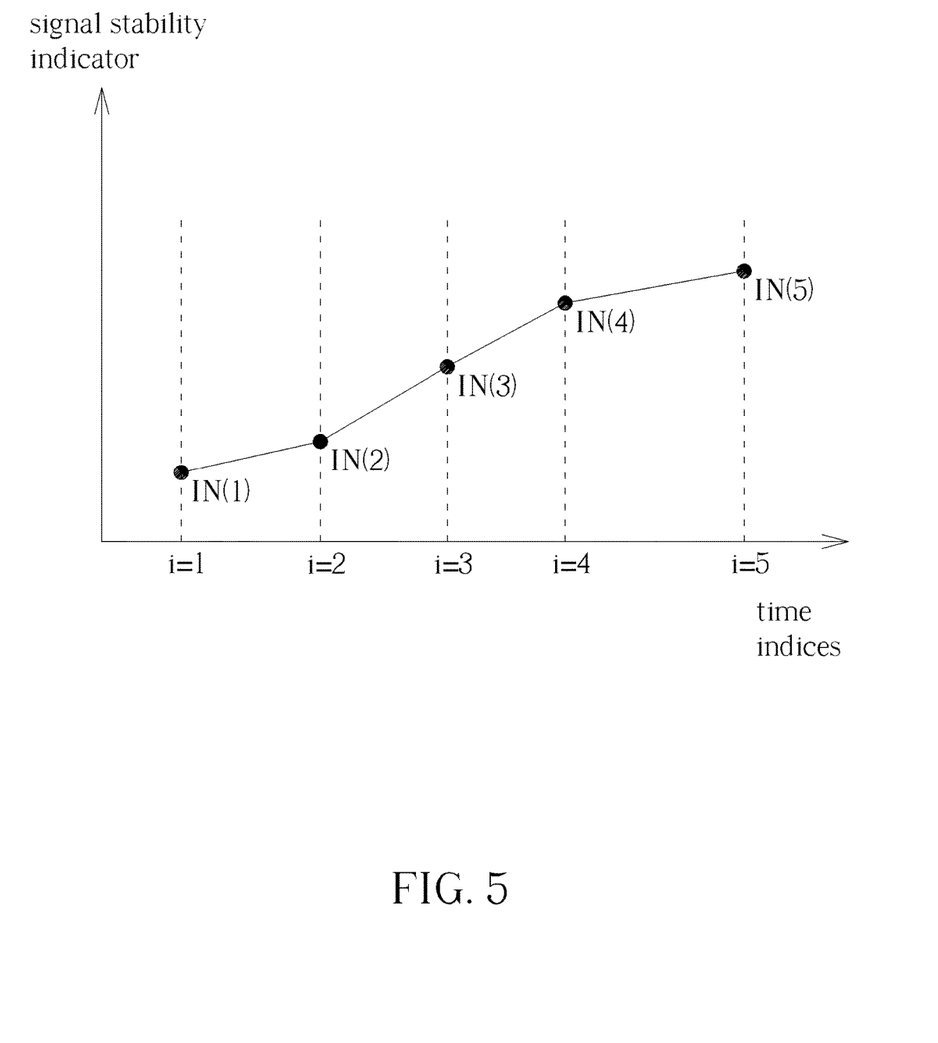
FIG. 5 is an illustration of signal stability indicators of different time indices of the system in FIG. 1.

FIG. 5 is an illustration of signal stability indicators of different time indices of the system 100. In order to determine the stability of the wireless signal and predict the stability of the wireless signal, a plurality of signal stability indicators with different time indices can be used for calculating a trend indicator. In FIG. 5, X axis is denoted as a time indices axis. Y axis is denoted as a value axis of the trend indicator. IN(1) is denoted as a signal stability indicator corresponding to a time index i equal to one (i.e., i=1). IN(2) is denoted as a signal stability indicator corresponding to a time index i equal to two (i.e., i=2). IN(3) is denoted as a signal stability indicator corresponding to a time index i equal to three (i.e., i=3). IN(4) is denoted as a signal stability indicator corresponding to a time index i equal to four (i.e., i=4). IN(5) is denoted as a signal stability indicator corresponding to a time index i equal to five (i.e., i=5). Generally, the system 100 can use $N_{IN}$ signal stability indicators for generating the trend indicator. Here, $N_{IN}$ is a positive integer greater than or equal to two. For the signal stability indicator IN(4) in FIG. 5, compared with the signal stability indicator IN(5), the signal stability indicator IN(4) can be generated by calculating an earlier time weighting sum of the at least one received testing signal during an earlier time interval. Similarly, an earlier time weighting of each received testing signal during the earlier time interval is equal to $-k^{th}$ power of an absolute time difference. The absolute time difference is an absolute value of a time difference between an earlier arrival time of the each received testing signal during the earlier time interval and a terminal time of the earlier time interval. Here, k is a positive integer. In FIG. 5, the signal stability indicator IN(1) is a earliest signal stability indicator. The signal stability indicator IN(5) is a latest signal stability indicator. In other words, the signal stability indicator IN(1) to the signal stability indicator IN(5) correspond to different time indices.

After signal stability indicators corresponding to different time indices are acquired by the system 100, the system 100 can perform a weighting process to adjacent two signal stability indicators. For simplicity, hereafter, IN(i) is denoted as a first signal stability indicator. IN(i−1) is denoted as a second signal stability indicator. Time corresponding to the first signal stability indicator IN(i) is later than time corresponding to the second signal stability indicator IN(i−1). The system 100 can generate a difference by subtracting the second signal stability indicator IN(i−1) from the first signal stability indicator IN(i). The mathematical representation of the difference can be written as [IN(i)−IN(i−1)]. In the following, the system 100 can generate a trend indicator by multiplying the difference equal to [IN(i)−IN(i−1)] with a weighting. Here, for example, the system 100 can use a positive integer p for generating the weighting equal to pth power of a time index i corresponding to the first signal stability indicator IN(i), written as $i^P$. In the embodiment, the system 100 can generate the trend indicator by multiplying [IN(i)−IN(i−1)] with $i^P$. In other words, the mathematical representation of the trend indicator can be written as [IN(i)−IN(i−1)]×($i^P$).

The meaning of the trend indicator [IN(i)−IN(i−1)]×($i^P$) previously mentioned can be regarded as a time-variation trend of the stability of the wireless signal between two different time indices. Particularly, when the second signal stability indicator IN(i−1) is greater than the first signal stability indicator IN(i). A trend indicator [IN(i)−IN(i−1)]×($i^P$) is a negative value. It implies that the stability of the wireless signal (or say, linking quality) is getting worse. On the contrary, when the second signal stability indicator IN(i−1) is smaller than the first signal stability indicator IN(i). A trend indicator [IN(i)−IN(i−1)]×($i^P$) is a positive value. It implies that the stability of the wireless signal (or say, linking quality) is getting better. Further, since the weighting $i^P$ is introduced to the system 100, a time index i close to the current time results in a large value of the weighting $i^P$ (i.e., because the time index i is large, such as i=5).

In order to integrate information of the signal stability indicator IN(1) to the signal stability indicator IN(5), the system 100 can generate a plurality of trend indicators corresponding to different time indices. For example, the system 100 can generate a trend indicator [IN(2)−IN(1)]×($2^P$). The system 100 can generate a trend indicator [IN(3)−IN(2)]×($3^P$). The system 100 can generate a trend indicator [IN(4)−IN(3)]×($4^P$). The system 100 can generate a trend indicator [IN(5)−IN(4)]×($5^P$). Then, the system 100 can generate a signal quality trend indicator TD equal to a sum of the plurality of trend indicators. The mathematical representation of the signal quality trend indicator TD can be written below.

$$TD = \sum_{i=2}^{5} (IN(i) - IN(i-1)) \times (i^P) \qquad \text{(Equation 2)}$$

In Equation 2, the signal quality trend indicator is denoted as TD. The signal quality trend indicator TD can be combined by several terms of the trend indicators in different time indices. Therefore, positive trend indicators can be offset against negative trend indicators. Further, a trend indicator close to the current time is a dominating term of the signal quality trend indicator TD. For example, some trend indicators close to previous time indices are negative values. Some trend indicators close to current time indices are positive values. Since the trend indicators close to current time indices can be regarded as dominating terms of the signal quality trend indicator TD, a signal quality trend indicator TD equal to a sum of all trend indicators is a positive value even though partial positive trend indicators are offset against negative trend indicators. The signal quality trend indicator TD equal to a positive value implies that the stability prediction of the wireless signal is satisfactory. On the contrary, some trend indicators close to previous time indices are positive values. Some trend indicators close to current time indices are negative values. Since the trend indicators close to current time indices can be regarded as dominating terms of the signal quality trend indicator TD, a signal quality trend indicator TD equal to a sum of all trend indicators is a negative value even though partial negative trend indicators are offset against positive trend indicators. The signal quality trend indicator TD equal to a negative value implies that the stability prediction of the wireless signal is poor. Thus, According to a value of the signal quality trend indicator TD, the system 100 can predict the linking quality of the wireless signal.

Further, the system 100 can generate an arrival rate. The arrival rate is equal to the number of at least one received testing signal divided by a length of the time interval. In the embodiment, the second transceiver 11 can identify $N_{RX}$ received testing signals RTS during a time interval T. Thus, the mathematical representation of the arrival rate can be written as $N_{RX}/T$. Here, the arrival rate is denoted as AR. After the system 100 generates the signal stability indicator IN, the signal quality trend indicator TD, and the arrival rate AR, the system 100 can generate a signal quality factor QF. Specifically, the signal quality factor QF can be generated in a form of linear combination with the signal stability indicator IN, the signal quality trend indicator TD, and the arrival rate AR. However, the prevent invention is not limited to generating the signal quality factor QF by using a linear combination function. Any linear or non-linear algorithm for generating the signal quality factor QF falls into the scope of the present invention. In the embodiment, when the quality factor QF is generated by using the linear combination function, the mathematical representation of the quality factor QF can be written below.

$$QF=(\alpha \times AR)+(\beta \times IN)+(\gamma \times TD) \quad \text{(Equation 3)}$$

In Equation 3, AR is the arrival rate. IN is the signal stability indicator. TD is the signal quality trend indicator. Constants $\alpha$, $\beta$, and $\gamma$ are three non-negative real values. Particularly, the constants $\alpha$, $\beta$, and $\gamma$ can be regarded as weightings for generating the signal quality factor QF. When a constant (i.e., $\alpha$, $\beta$, or $\gamma$) is zero, a term with zero weighting in Equation 3 of the signal quality factor QF can be ignored. Thus, by adjusting the constants $\alpha$, $\beta$, and $\gamma$ appropriately, the signal quality factor QF can be generated with high reliability and high reference value.

After the signal quality factor QF is generated by the system 100, the system can determine an operation according to the signal quality factor QF. For example, since the signal quality factor QF can be regarded as a comprehensive indicator of the wireless signal and the linking quality, the system 100 can determine a disconnection operation, a connection maintenance operation, or a connection retrying operation according to the signal quality factor QF. For example, when the signal quality factor QF is too small, it implies that the linking quality is unstable, leading to wireless signal fading result. Thus, the system 100 can perform disconnection operation for avoiding power consumption caused by re-connecting the unstable wireless link again and again. When the signal quality factor QF is a tolerable value, the system 100 can perform a connection maintenance operation, or retry to establish a wireless link to another destination device. Particularly, when the connection maintenance operation or the connection retrying operation is performed by the system 100, the system 100 can execute at least one operation of a power adjusting operation, a channel converting operation, and an antenna adjusting operation. For example, when the system 100 performs the power adjusting operation, the system 100 can increase or decrease utilized power. Particularly, the system 100 can decrease the utilized power for reducing power consumption if the signal quality factor QF is large (i.e., it implies that the linking quality is stable). The system 100 can increase the utilized power for enhancing linking stability if the signal quality factor QF becomes small (i.e., it implies that the linking quality is unstable). When the system 100 performs the channel converting operation, the system 100 can convert a utilized channel to an available channel. For example, when the utilized channel is severely interfered, the system 100 can convert the utilized channel to the available channel with little interference for maintaining linking quality and stability. For example, 12 available channels are introduced to Wi-Fi standard with 2.4G protocol. When the linking quality is decreased, the system 100 can start to perform the channel converting operation by converting the utilized channel to another available channel for maintaining linking quality and stability. When the system 100 performs the antenna adjusting operation, the system 100 can replace a utilized antenna with an available antenna, or adjusting a direction of a signal transmitted from or received by the utilized antenna. For example, when the first transceiver 10 and the second transceiver 11 are adopted to multi-antennas structure, once a linking quality of a utilized antenna is decreased according to the signal quality factor QF, the system 100 can convert the utilized antenna with low linking quality to another available antenna or adjusting the direction of the signal transmitted from or received by the utilized antenna with low linking quality for enhancing the linking quality. However, the present invention is not limited to using aforementioned methods for enhancing the linking quality according to the signal quality factor QF. Any reasonable method for enhancing the linking quality according to the signal quality factor QF falls into the scope of the present invention.

Figure 6:
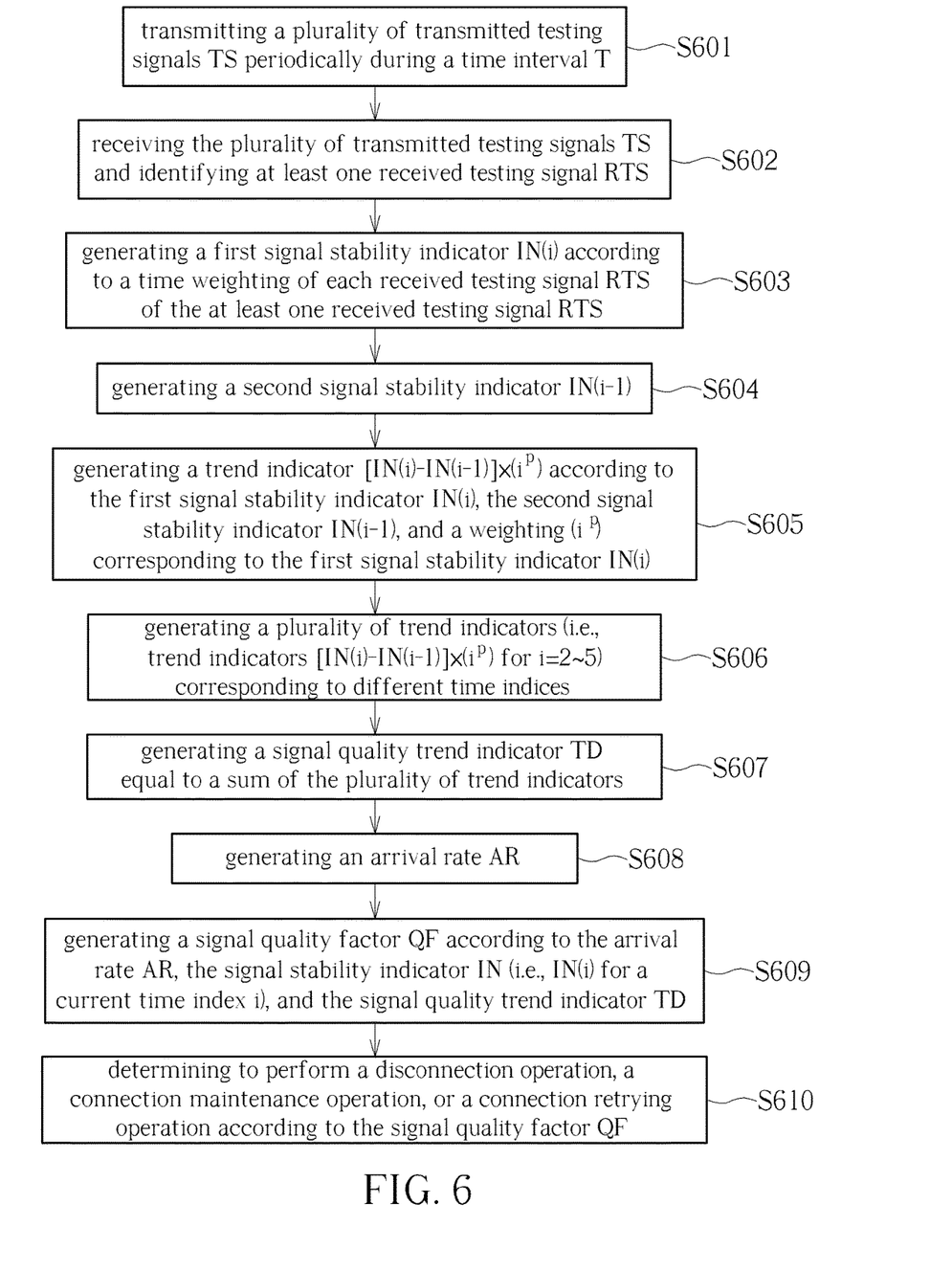
FIG. 6 is a flow chart of a method for determining stability of the wireless signal by using the system in FIG. 1.

FIG. 6 is a flow chart of a method for determining stability of the wireless signal by using the system 100. The method for determining stability of the wireless signal includes step S601 to step S610. Any reasonable step modification falls into the scope of the present invention. Step S601 to step S610 are illustrated below.

step S601: transmitting a plurality of transmitted testing signals TS periodically during a time interval T;

step S602: receiving the plurality of transmitted testing signals TS and identifying at least one received testing signal RTS;

step S603: generating a first signal stability indicator IN(i) according to a time weighting of each received testing signal RTS of the at least one received testing signal RTS;

step S604: generating a second signal stability indicator IN(i−1);

step S605: generating a trend indicator $[IN(i)-IN(i-1)] \times (i^P)$ according to the first signal stability indicator IN(i), the second signal stability indicator IN(i−1), and a weighting ($i^P$) corresponding to the first signal stability indicator IN(i);

step S606: generating a plurality of trend indicators (i.e., trend indicators [IN(i)−IN(i−1)]×($i^P$) for i=2~5) corresponding to different time indices;

step S607: generating a signal quality trend indicator TD equal to a sum of the plurality of trend indicators;

step S608: generating an arrival rate AR;

step S609: generating a signal quality factor QF according to the arrival rate AR, the signal stability indicator IN (i.e., IN(i) for a current time index i), and the signal quality trend indicator TD;

step S610: determining to perform a disconnection operation, a connection maintenance operation, or a connection retrying operation according to the signal quality factor QF.

Step S601 to step S610 are previously illustrated. Thus, they are omitted here. By executing step S601 to step S610, the system 100 can precisely determine the stability of the wireless signal and the linking quality trend of the wireless signal. Thus, unnecessary power consumption or system resources can be reduced.

To sum up, the present invention discloses a method for determining stability of a wireless signal. The method can precisely determine stability of the wireless signal according to an arrival time distribution of the received testing signals. Further, the method can use a plurality of trend indicators corresponding to different time indices for generating a signal quality trend indicator in order to predict signal stability quality. Further, the method can generate a signal quality factor according to the arrival rate, the signal stability indicator, and the signal quality trend indicator to execute various linking operations for enhancing linking quality and reducing unnecessary power consumption or system resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining stability of a wireless signal comprising:
   transmitting a plurality of transmitted testing signals periodically during a time interval;
   receiving the plurality of transmitted testing signals and identifying at least one received testing signal from the plurality of transmitted testing signals; and
   generating a first signal stability indicator according to a time weighting of each received testing signal of the at least one received testing signal;
   wherein the time weighting is a positive real value equal to $-k^{th}$ power of an absolute time difference, the absolute time difference is an absolute value of a time difference between an arrival time of the each received testing signal and a current time, k is a positive integer, and a time weighting of a received testing signal later identified is greater than a time weighting of a received testing signal previously identified.

2. The method of claim 1, wherein generating the first signal stability indicator according to the time weighting of the each received testing signal of the at least one received testing signal is generating the first signal stability indicator equal to a time weighting sum of the at least one received testing signal.

3. The method of claim 1, wherein generating the first signal stability indicator according to the time weighting of the each received testing signal of the at least one received testing signal is generating the first signal stability indicator equal to a time weighting sum of the at least one received testing signal.

4. The method of claim 1, further comprising:
   generating a second signal stability indicator; and
   generating a trend indicator according to the first signal stability indicator, the second signal stability indicator, and a weighting corresponding to the first signal stability indicator;
   wherein the weighting is a positive integer, time corresponding to the first signal stability indicator is later than time corresponding to the second signal stability indicator.

5. The method of claim 4, wherein the second signal stability indicator is generated by calculating an earlier time weighting sum of the at least one received testing signal during an earlier time interval, an earlier time weighting of each received testing signal during the earlier time interval is equal to $-k^{th}$ power of an absolute time difference, the absolute time difference is an absolute value of a time difference between an earlier arrival time of the each received testing signal during the earlier time interval and a terminal time of the earlier time interval, and k is a positive integer.

6. The method of claim 5, wherein generating the trend indicator according to the first signal stability indicator, the second signal stability indicator, and the weighting corresponding to the first signal stability indicator is generating the trend indicator by multiplying the weighting with a difference between the first signal stability indicator and the second signal stability indicator.

7. The method of claim 4, wherein the weighting corresponding to the first signal stability indicator is equal to pth power of a time index corresponding to the first signal stability indicator, and p is a positive integer.

8. The method of claim 7, wherein generating the trend indicator according to the first signal stability indicator, the second signal stability indicator, and the weighting corresponding to the first signal stability indicator is generating the trend indicator by multiplying the weighting with a difference between the first signal stability indicator and the second signal stability indicator.

9. The method of claim 4, further comprising:
   generating a plurality of trend indicators corresponding to different time indices; and
   generating a signal quality trend indicator equal to a sum of the plurality of trend indicators.

10. The method of claim 9, further comprising:
    generating an arrival rate; and
    generating a signal quality factor according to the arrival rate, the first signal stability indicator, and the signal quality trend indicator;
    wherein the arrival rate is equal to number of the at least one received testing signal divided by a length of the time interval.

11. The method of claim 10, further comprising:
    determining to perform a disconnection operation, a connection maintenance operation, or a connection retrying operation according to the signal quality factor.

12. The method of claim 11, further comprising:
    when the connection maintenance operation or the connection retrying operation is performed, executing at least one operation of a power adjusting operation, a channel converting operation, and an antenna adjusting operation;

wherein the power adjusting operation comprises increasing or decreasing utilized power, the channel converting operation comprises converting a utilized channel to an available channel, the antenna adjusting operation comprises replacing a utilized antenna with an available antenna, or adjusting a direction of a signal transmitted from or received by the utilized antenna.

13. The method of claim 10, wherein the signal quality factor is equal to $(\alpha \times AR)+(\beta \times IN)+(\gamma \times TD)$, AR is the arrival rate, IN is the first signal stability indicator, TD is the signal quality trend indicator, and $\alpha$, $\beta$, and $\gamma$ are three non-negative real values.

14. The method of claim 13, further comprising:
determining a disconnection operation, a connection maintenance operation, or a connection retrying operation according to the signal quality factor.

15. The method of claim 14, further comprising:
when the connection maintenance operation or the connection retrying operation is performed, executing at least one operation of a power adjusting operation, a channel converting operation, and an antenna adjusting operation;

wherein the power adjusting operation comprises increasing or decreasing a utilized power, the channel converting operation comprises converting a utilized channel to an available channel, the antenna adjusting operation comprises replacing a utilized antenna with an available antenna, or adjusting a direction of a signal transmitted from or received by the utilized antenna.

* * * * *